United States Patent [19]

Khalafalla et al.

[11] Patent Number: 4,765,415

[45] Date of Patent: Aug. 23, 1988

[54] ISOELECTRIC DRILLING METHOD

[75] Inventors: Sanaa E. S. Khalafalla; William H. Engelmann, both of Minneapolis; John E. Pahlman, Bloomington, all of Minn.

[73] Assignee: The United States of America as represented by the Secretary of Interior, Washington, D.C.

[21] Appl. No.: 5,041

[22] Filed: Jan. 15, 1987

[51] Int. Cl.$^4$ .......................... E21B 7/00; E21B 21/06
[52] U.S. Cl. ........................................ 175/50; 175/64; 175/66; 175/206
[58] Field of Search .................. 175/39, 40, 50, 64–66, 175/206; 252/8.514; 73/151, 153; 166/902

[56] References Cited

U.S. PATENT DOCUMENTS

| | | | |
|---|---|---|---|
| 2,219,312 | 10/1940 | Hayward et al. | 204/182.2 X |
| 2,283,206 | 5/1942 | Hayward | 204/182.2 X |
| 3,307,625 | 3/1967 | Johnson et al. | 175/66 |
| 4,342,222 | 8/1982 | Alekhin et al. | 73/153 |
| 4,385,666 | 5/1983 | Mamadzhanov et al. | 73/151 |
| 4,410,052 | 10/1983 | Mamadzhanov et al. | 175/66 |

OTHER PUBLICATIONS

Hackh's Chemical Dictionary, Fourth Edition, McGraw Hill Book Co., New York (1969), p. 361.
Parks, "The Isoelectric Points of Solid Oxides, Solid Hydroxides, and Aqueous Hydroxo Complex Systems", Chemical Reviews, 65, 177 (1965).
Hiemenz, "Principles of Colloid and Surface Chemistry", Marcel Dekker, Inc., New York (1977), pp. 353, 381 and 483.

Primary Examiner—Jerome Massie, IV
Assistant Examiner—Bruce M. Kisliuk
Attorney, Agent, or Firm—E. Philip Koltos

[57] ABSTRACT

The enchancement of rock drilling by neutralizing the rock surface charge with respect to the drilling fluid. The isoelectric condition is obtained by nullifying the zeta potential of the rock surface by chemical additives such as surfactants or any material. Drilling enchancement is maintained as long as the rock zeta potential registers a zero reading. An apparatus and method is disclosed herein to achieve and maintain this isoelectric condition and provide for the maximal drilling rate and drill bit life.

10 Claims, 2 Drawing Sheets

… … …

ISOELECTRIC DRILLING METHOD

BACKGROUND OF THE INVENTION

The invention pertains to drilling and rock excavation as well as petroleum, oil and gas drilling, whether off-shore or terrestrial. The invention also relates to off-shore mineral exploration.

Drilling and rock excavation represent a significant segment of the total mining system, and the yearly drilling costs for copper, iron, lead, zinc, silver, gold and crushed and dimension stone in the U.S. are about 1.5 billion dollars.

Bit costs represents about 600 million dollars or 40% of the total costs.

Productivity of drilling is normally improved by increasing the applied mechanical stress in order to increase the drilling rate; however, such increases in applied mechanical stress causes catastrophic bit or blade wear and reduces its useful drilling life.

Therefore, significant savings could be realized in general drilling costs if a method is devised which allows increased drilling rates at constant applied mechanical stress during the drilling, but prevents bit or blade wear. In particular, these savings would be reflected in the drilling and rock excavation areas as well as in petroleum, oil, gas and mineral drilling exploration.

Enhanced drilling rates have been previously observed in the laboratory by other researchers on a sporadic or on-and-off basis and are summarized by P.J. Watson and W.H. Engelmann, in an article entitled *Chemically Enhanced Drilling*: An Annotated Tabulation of Published Results. BuMines IC 9039, 1985, 53 pp. These enchanced drilling rates were observed upon the addition of chemicals as well as surfactants; however, favorable results that occurred on the laboratory scale failed to materialize on larger scales. As a result, industrial drillers have ignored these observations and used drilling fluids or muds of the barite type to facilitate deep rock penetration.

Furthermore, laboratory results were found to be very sensitive to the batch of distilled/deionized water used. For a given batch of water, the drilling data is reasonably reproducible and the data trends remain the same from one batch to another batch of distilled/deionized water. However, trace metals present in the distilled/deionized water, such as copper and aluminum were found to exert unpredictable effects on the base-line drilling results.

The present invention provides a means for enhancing drilling rates while also prolonging the bit life at constant applied mechanical stress during drilling operations. This is accomplished by virtue of the invention's discovery that enhanced drilling rates are a function of the rock surface condition, and that, if the rock surface condition is maintained at zero point charge, (ZPC), regardless of the salt type or concentration or water source, enhanced drilling rates coupled with prolongation of the bit life are attained.

SUMMARY OF THE INVENTION

It is an object of the present invention to provide a drilling fluid which is adjusted, either by concentration or by additions of altervalent ions, to produce isoelectric point conditions at the rock/fluid interface to allow drilling at maximum efficiency with the added bonus of extended bit life.

A further object of the invention is to provide a drilling fluid for off-shore and marine drilling, wherein the chemical make-up of the material that allows maximum drilling efficiency with extended bit life is indigenous to the marine environment.

A yet further object of the invention is to provide chemical guidelines for obtaining isoelectric point conditions at the rock/fluid interface required for maximizing drilling rates and minimizing bit wear.

In general, the invention accomplishes these results by adding certain chemical additives to the drilling fluid at a concentration level that produces a zero zeta-potential at the rock/fluid interface. Under these conditions, the rock surface is at its isoelectric point (IEP) or zero point charge (ZPC). At the IEP, it has been found that enhancement of the drilling rate by as much as 96 to 115% prolongs the bit life by as much as 67 to 99%.

These and other objects of the invention will become more apparent from the description hereafter.

DETAILED DESCRIPTION OF THE INVENTION

In studying the effects of additive concentration on drilling rates as well as the effects of multivalent cationic species of additive concentrations, the condition for maximal drilling rate, namely the rock condition defined by its Isoelectric Point (IEP) or Zero Point Charge (ZPC) was determined. Therefore, any chemical at the proper concentration that can create this rock surface condition is operable in the context of the invention.

On the other hand, if the chemical additive cannot produce this particular surface condition, then it is not operable in the context of the invention. An important benefit of operating at the rock IEP surface condition is the reduced bit wear and therefore prolongation of the bit life. To ensure adherence to isoelectric conditions at the rock/fluid interface, the following modus-operandi has been developed:

A percussion or rotating drill with a circulating drilling fluid which is common in the present state-of-the art is employed. The fluid tank is used to remove the rock bits and sediment and recycle the drilling fluid. Bits and pieces of diamonds and/or tungsten carbide are usually recovered from this sediment.

An in-line electrophoresis meter or zeta potential reader is placed in the drill circulation system to register the zeta potential of the drilling fluid/rock powder interface as it exits from the drill, by placing the inlets and outlets of a Komline-Sanderson Model ZR-11 Zeta Reader into the exiting drilling fluid/rock powder interface and watching a moving grid line and rock particle speed moving in an electric field of 5 to 10 volts per cm (v/cm), (both of which are displayed on the unit's video monitor) and matching the grid line and particle speeds using a balance potentiometer. The zeta potential is then read in millivolts (mv) from the unit's digital readout.

Figure 3:
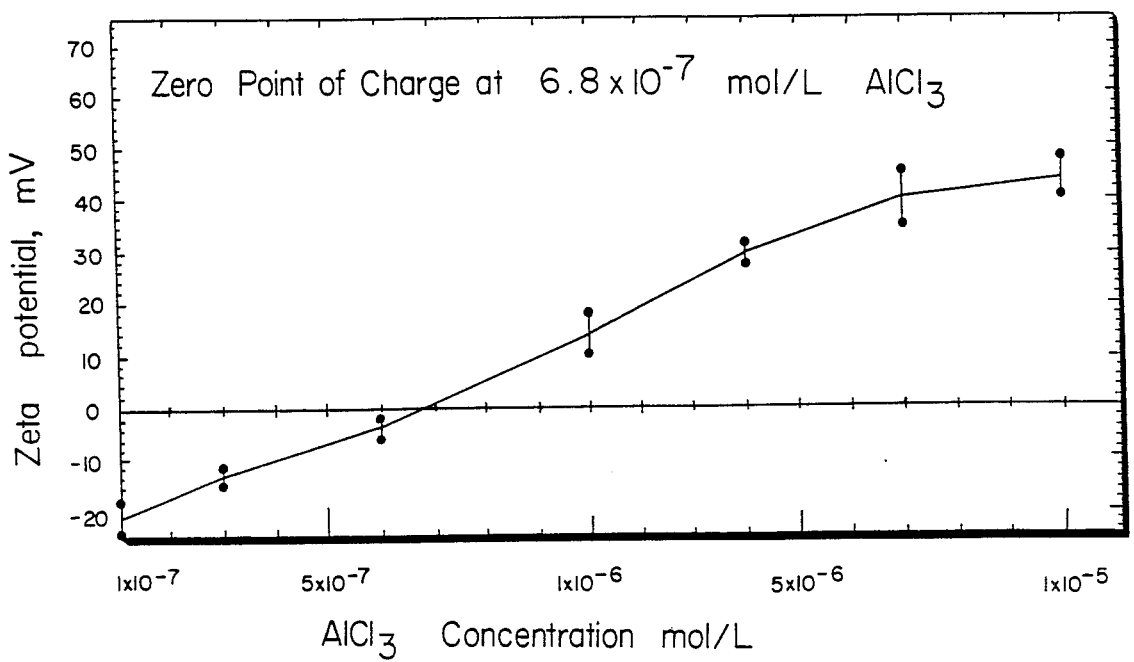
FIG. 3 is a plot of the zeta potential as a function of $AlCl_3$ concentration.

The zeta potential, zero point of charge (ZPC) or isoelectric point (IEP) can be identified by the amount of salt concentration that brings the rock fragments to zero point of charge or IEP, which represents the pH at which an immersed solid surface has zero net charge and the pH resulting in electrically equivalent concentrations of positive and negative complexes, or the salt concentration at which the zeta potential plot intersects the zero potential line, as typified in FIG. 3.

A microprocessor with a double switch gating mechanism is then placed in the system and one gate allows the fluid of zero zeta potential to pass through to the drilling fluid tank where it is allowed to settle, and the supernatent fluid is recycled to the drill.

If the fluid departs from the zero zeta conditions, it is relegated through the second gate to an adjustment tank where it is titrated wit $AlCl_3$, NaCl or traces of acid or base to the zero zeta potential. Any chemical titrant will suffice in the context of the invention if it can adjust the pM or pH to the isoelectric point of the rock/fluid interface.

Once the zeta reader registers a zero reading, the adjusted fluid is passed to the tank, otherwise it goes back to the chemical titrator for further tuning of its zeta potential.

Figure 1:
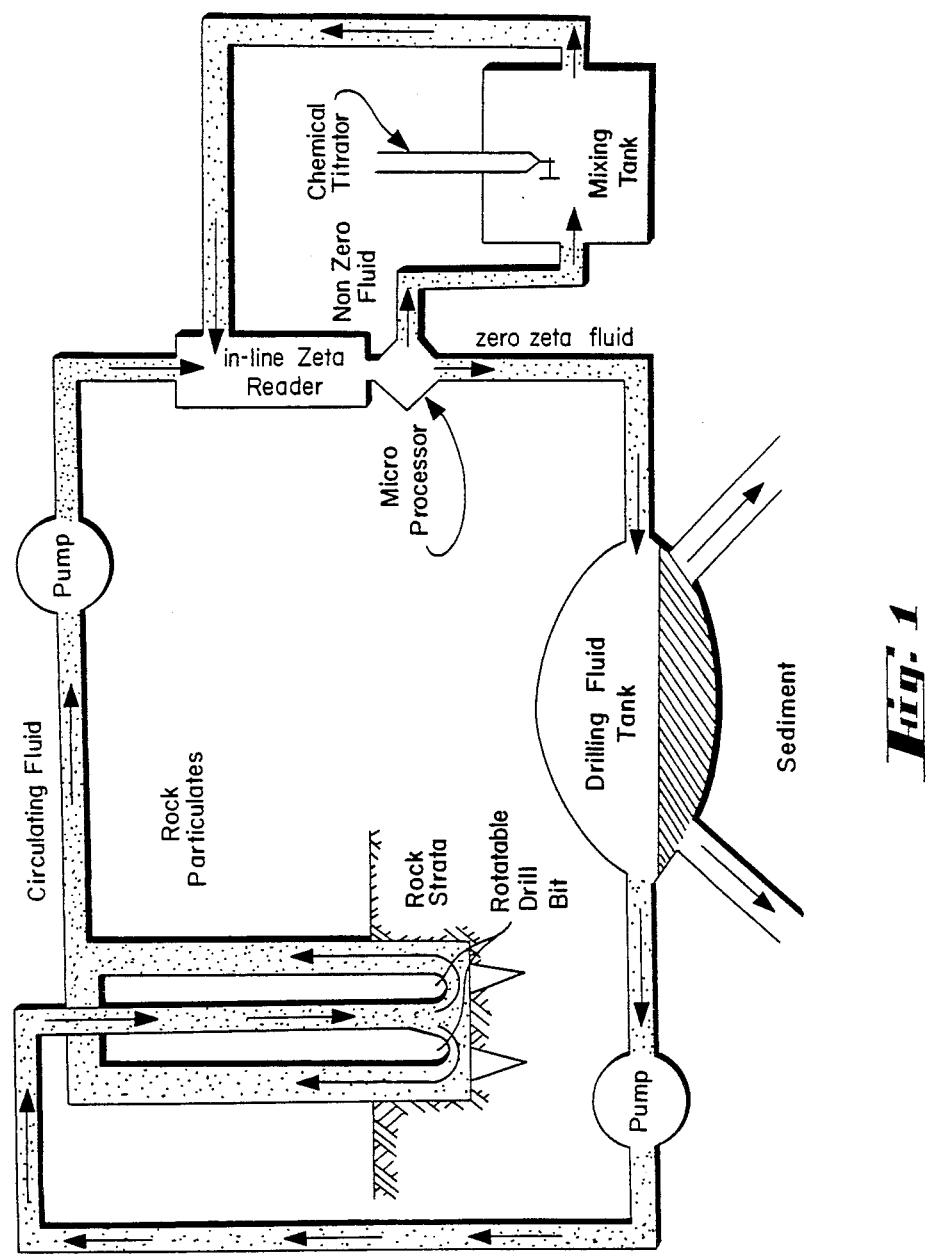
FIG. 1 is a flow-sheet representation of the drilling fluid circulation system employing the invention process.

FIG. 1 shows a diagramatic sketch or flow-sheet of the drilling fluid circulation system employing the invention process. Drilling fluid that has been adjusted to the proper concentration to effect a zero zeta potential at the rock-fluid interface (zero zeta fluid) is circulated through the drill bit. Afterwards an in-line electrophoresis meter or zeta potential reader is employed to register the zeta potential of the drilling fluid/rock powder interface as it exits from the drill. A microprocessor with a double switch gating mechanism then, depending upon the zeta potential measurement results, either allows the fluid to pass through one gate to the drilling fluid tank if it is the zero zeta fluid or if it is not a zero zeta fluid diverts it through the second gate to an adjustment tank where it is titrated with a zeta potential modifying agent to attain the required zero zeta potential concentration. Once the zeta reader registers a zero zeta reading for the adjusted fluid it is passed through to the drilling fluid tank, otherwise it goes back to the chemical titrator for further tuning of its zeta potential. The drilling fluid tank is used to remove the rock bits and sediment before the zero zeta fluid is recycled to the drilling bit.

In other words, in FIG. 1, the microprocessor gating mechanism (1) allows only zero zeta fluid to circulate to the drilling fluid tank and rejects non-zero fluid to the titrator tank for adjustment and make up to volume. Chemical titrator (2) delivers $AlCl_3$, NaCl, or acid/base to adjust the fluid to the zero potential and hence the rock surface to the isoelectric point (IEP).

In the current state of the drilling art, ordinary drilling fluids usually contain barium salts because of their high specific gravity, however, no attempt is made in ordinary drilling practice to adjust the amount of these salts to reach zero zeta conditions. In marine drilling, excess sodium and magnesium chloride in sea water would undoubtedly affect the electric double layer, and here again, there is no known attempt to adjust conditions to the rock isoelectric point.

By using the teachings of the invention, the addition of an excess of positively charged ions ($Ba^{2+}$, $Na^+$, or $Mg^{2+}$) would bring the rock to a positive zeta potential. To bring the rock back to zero zeta potential, i.e. the isoelectric point, a small amount of alkali (such as NaOH or $Ba(OH)_2$) would be required. On the other hand, if the salt concentrations are not high enough and the rock is still at its negative zeta potential, then addition of positively charged cations such at $Al^{3+}$ or $Na^+$ (the latter being preferred in the marine environment) will bring the rock to its IEP. Minute amounts of acid ($H_3O^+$) can also be used to bring about the same effect.

EXAMPLE 1

The effect of cation concentration was determined as follows:

Drilling tests were performed on Sioux quartzite with $AlCl_3$ solutions as the drilling fluid. The drilling apparatus consisted of a Houdaille Powermatic 1.13 Kw ($1\frac{1}{2}$ Hp) DC-controlled variable speed drill press adapted to use a 16 mm ($\frac{5}{8}$ in) diamond impregnated coring bit. The bit rotational speed was 100 rev/min under 150 kg total load. Drilling fluid was pumped through the bit at a rate of 120 mL/min. Drilling in high alumina refractory brick prior to each test honed the bit to a sharpness corresponding to an initial penetration rate of 4.5 mm/min.

Tests consisted of randomly drilling as many 12.7 cm (5 in) deep holes in a 15.2 cm (6 in) cube of rock as was necessary to dull the bit to a final "dull" state corresponding to a penetration rate of 2.0 mm/min. The total penetration rate was determined using a Linear Variable Differential Transformer (LVDT) wherein the output was recorded on an XY recorder as a function of time. Periodic calibrations of the LVDT enabled the total penetration rate to be calculated from the recorder graphs.

Bit life was determined as the time it took for a bit to progress from the "sharp" state (4.5 mm/min penetration rate) to the "dull" state (2.0 mm/min pentration rate). For comparison, 12 replicated drilling tests were conducted on Sioux quartzite using distilled/deionized water as the base line drilling fluid.

Figure 2:
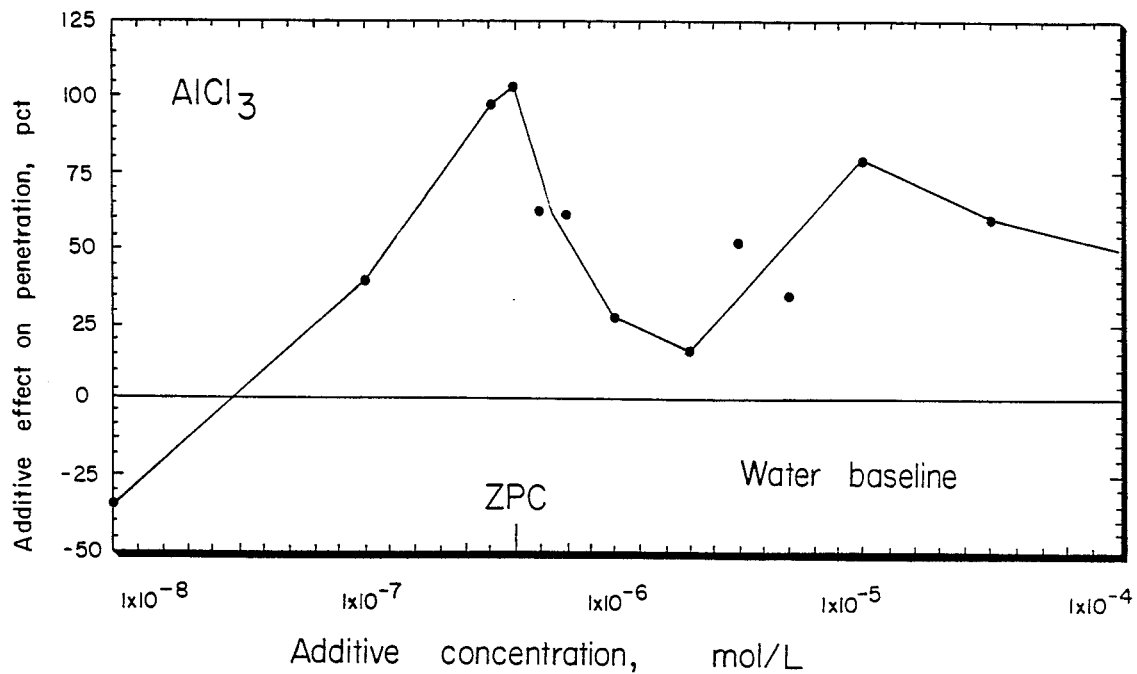
In FIG. 2 the percent change in the amount of penetration obtained with $AlCl_3$ solutions compared to distilled deionized water as drilling fluids is plotted as a function of the $AlCl_3$ concentration.

Drilling tests were conducted with $AlCl_3$ solutions at concentrations below, above, and at the ZPC concentration with at least 5 replicate runs completed at the critical ZPC concentrations. Comparison of the additive drilling test results with those for water on Sioux quartzite showed that the greatest increase in total penetration rate was obtained when drilling with ZPC concentrations of the additive (FIG. 2). In FIG. 2 the percent change in the amount of penetration obtained with $AlCl_3$ solutions compared to distilled deionized water as drilling fluids is plotted as a function of the $AlCl_3$ concentration. The maximum penetration increase is obtained when drilling with the zero point of charge (ZPC) concentration solution. The total penetration rate increased 104% with $6 \times 10^{-7}$ mol/L $AlCl_3$ solutions.

Increased penetration rates are ordinarily achieved by increasing the thrust or rotational speed of the drill at the expense of bit life; however, drilling of Sioux quartzite with the ZPC concentration of $AlCl_3$ resulted in extending the bit life by 99%.

EXAMPLE 2

The effect of cationic charge was determined as follows:

The thickness and charge on the double layer at the rock/fluid interface is strongly influenced by the ionic valencies, and the effects of solutions of $ZrCl_4$, $CaCl_2$, and NaCl on drilling performance was determined with Sioux quartzite. The penetration rate increased 96% with $1.4 \times 10^{-6}$ m $ZrCl_4$, 97% with $1.6 \times 10^{-2}$ M $CaCl_2$, and 115% with 0.2 M NaCl. These effects were observed at salt concentrations very close to those required to bring the rock surface to the ZPC state.

EXAMPLE 3

Identification of the Rock Isoelectric Point was determined as follows:

The ZPC state was identified by the salt concentration that brings the rock fragments to zero zeta potential. Zeta potential determinations were made on a Komline-Sanderson Model ZR-11 Zeta Reader. Rock fragments (about 0.2 gm) of 74 m ($-200$ mesh) were added to a stirred reservoir containing 1000 ml of distilled/deionized water. Inlet and outlet tubes from the zeta reader were introduced into the reservoir to allow zeta potential determination of the rock in distilled water. This was done by watching a moving gird line and rock particle moving in an electric field of 5 to 10 volts per cm (V/cm) (both of which were displayed on the unit's video monitor) and matching the grid line and particle speeds using a balance potentiometer. The Zeta potential was then read in millivolts (mV) from the unit's digital readout. Thirty readings were taken to get a statistically-valid average and standard deviation.

After the zeta potential reading (which was notably always negative) was recorded for each rock in distilled water, small precise doses of concentrated ionic stock solution were added to the reservoir and thirty readings were again taken. Concentration of the added salt was increased until the zeta potential readings became positive. Three complete sets of tests were run for each inorganic ion/rock combination and a graph of average zeta potential versus concentration plotted for each combination. The zero point of charge (ZPC) was taken to be the concentration at which the zeta potential plot intersected the zero potential line.

For Sioux quartzite the ZPC in the presence of $AlCl_3$, $ZrCl_4$, $CaCl_2$, and NaCl were found at concentrations of $6.8 \times 10^{-7}$ mol/L, $1.4 \times 10^{-6}$ mol/L, $1.6 \times 10^{-2}$ mol/L, and $2.0 \times 10^{-1}$ mol/L, respectively. FIG. 3 gives typical data for the variation of zeta potential with $AlCl_3$ concentration. The zero point of charge (ZPC) concentration is determined by the intersection of the curve with the zero zeta potential line. For $AlCl_3$ solutions, the ZPC concentration is determined to be $6.8 \times 10^{-7}$ mol/L.

It is apparent that highly charged cations exert the most profound effects on penetration rate and bit life. Except for Zr salts, the enhancement in drilling is a rapidly increasing function of cation valence (or charge). Zirconium solutions acted anomalously to this rule because the ionic form in its solutions is believed to partially hydrolyze to $ArOH^{3+}$, according to the following equation:

$$Zr^{4+} + H_2O = ZrOH^{3+} + H^+$$

Its ZPC concentration is therefore closer to that of the trivalent $Al^{3+}$ ion.

Drilling at the rock isoelectric point not only enhanced the drilling rate, but also extended the bit life. For instance, it was shown in Example 1 that an $AlCl_3$ concentration of $6 \times 10^{-7}$ mol/L imparts the Sioux quartzite with zero charge and extends the bit life by 99% compared with drilling with distilled deionized water.

EXAMPLE 4

Drilling with the zero zeta potential concentrations of $ZrCl_4$ $CaCl_2$ and NaCl were found to extend the bit life by 68, 73, and 76% respectively compared with drilling with distilled deionized water. This occurred while the drilling rates were enhanced by 96, 97, and 115% respectively, as described in example 3.

While not wishing to be bound by any theory, it is believed that by a theoretical model based on the electrocapillary behavior of the rock/fluid interfacial phase one could conclude that the rock surface tension is maximized at the IEP and drops on both sides of the chemical concentration defining that point. Since surface tension is a direct expression of interfacial rock stress, any increase in surface tension by chemical additives is equivalent to an increase of external stress at the rock surface phase. This exalted "chemical stress" when added to the applied mechanical stress produces higher drilling rates that can only be obtained at elevated mechanical stresses in the absence of chemical additives.

Ordinarily, one could expect the bit life to be shortened at these enhanced rates because the penetration velocity is increased by the chemical additive. Or, at best, the bit life should stay the same because the exerted mechanical force is kept constant. The extraordinary discovery of the invention is that the bit life is doubled (99%) by the chemical additive. This means that the drilling bits stay sharp for a much longer time while penetrating the rock at a much faster rate by the presence of the chemical additive that produces zero zeta potential at the rock/fluid interface or by having the rock at its zero point of charge (ZPC).

Furthermore, this type of tensile augmentation for rock framentation is more energy efficient than breakage enhancement caused by compressive forces alone because rock is weaker in tension than in compression.

This extraordinary phenomena is believed to be due to the suppression of the electrochemical part of bit corrosion. Bit wear is the resultant of both mechanical erosion or abrasion on the one hand, and electrochemical corrosion on the other hand. The latter mode of bit wear is apparently the result of galvanic current; in particular, anodic dissolution currents from the drill side to the rock phase of the interface. It appears that these galvanic currents are minimized at the ZPC. In this connection, what is unusual is the apparent significant contribution of electrochemical corrosion to the overall bit wear. In the past, it was generally believed that most of this wear was of mechanical origin.

What is claimed is:

1. An apparatus for increasing the drilling rate and useful drilling life of a drill bit comprising:
   a drill bit;
   means for supplying an ion charged fluid to the drill bit while it is drilling at a work surface;
   means for monitoring the zeta potential of the fluid being supplied to the bit; and
   means for adjusting the zeta potential of the monitored fluid being supplied to the bit and work surface to a point at or near zero.

2. An apparatus for increasing the drilling rate and useful drilling life of a rotary drill bit comprising;
   a rotary drill bit;
   means for supplying a mist of ion charged fluid to the drill bit while it is rotating and drilling at a work surface that results in a thin layer of the fluid on the work surface;

means for determining the zeta potential of the additive solution used to mist the work surface when rotating and drilling at the work surface; and means for adjusting the zeta potential of the misting fluid being supplied to the bit and work surface to a point at or near zero.

3. A method of determining the isoelectric point of rock surfaces in order to increase the drilling rate while prolonging the bit life of a drill during excavation and natural resource exploration at constant applied stress, comprising:

inserting an electrophoresis meter into a circulating drilling fluid tank of a drilling apparatus to measure the zero point charge of rock fragmentations during drilling; and adding a material selected from the group consisting of alkali, an acid or a cationic material into the drilling fluid until the concentration of said material in the drilling fluid is sufficient to register a zero-zeta potential reading at the rock/drilling fluid interface.

4. The method of claim 3 wherein an alkali material is used to reach the zero zeta potential.

5. The method of claim 3 wherein an acid material is used to reach the zero zeta potential.

6. The method of claim 3 wherein a cationic material is used to reach the zero zeta potential.

7. The method of claim 6 wherein the alkali material is selected form the group consisting of NaOH and $Ba(OH)_2$.

8. The method of claim 4, wherein the cationic material is selected from the group consisting of $AlCl_3$, $ZrCl_4$, $CaCl_2$ and NaCl.

9. The method of claim 6 wherein the cationic material is selected from the group consisting of cationic surfactants.

10. A method for determining the isoelectric point of rock surfaces in order to increase the drilling rate while prolonging the bit life of a drill during excavation and natural resource exploration at constant applied stress comprising:

inserting an electrophoresis meter into a circulating drill fluid tank of a drilling apparatus to measure the zero point charge of rock fragmentations during drilling; and adding a chemical additive into the drilling fluid until the concentration of said material in the drilling fluid is sufficient to register a zero-zeta potential reading at the rock/drilling fluid interface.

* * * * *